United States Patent
Doi et al.

(10) Patent No.: US 7,846,984 B2
(45) Date of Patent: Dec. 7, 2010

(54) METHOD AND APPARATUS FOR RECYCLING ULTRAVIOLET CURING RESIN, AND METHOD FOR MANUFACTURING OPTICAL RECORDING MEDIUM USING THAT RECYCLING METHOD

(75) Inventors: Yukako Doi, Takatsuki (JP); Toshiyuki Aoyama, Settsu (JP)

(73) Assignee: Panasonic Corporation, Osaka (JP)

( * ) Notice: Subject to any disclaimer, the term of this patent is extended or adjusted under 35 U.S.C. 154(b) by 961 days.

(21) Appl. No.: 11/102,687

(22) Filed: Apr. 11, 2005

(65) Prior Publication Data

US 2005/0238838 A1    Oct. 27, 2005

(30) Foreign Application Priority Data

Apr. 26, 2004  (JP)  ............... 2004-129280

(51) Int. Cl.
    *C08J 11/04*    (2006.01)
(52) U.S. Cl. ............ 521/40; 528/480; 503/200; 503/201; 428/64.2; 428/64.4; 428/64.8; 428/65.2; 347/172; 106/31.17; 106/31.27; 106/31.28
(58) Field of Classification Search ........... 521/40, 521/40.5, 46, 47, 48, 49.8; 210/634; 428/64.1, 428/64.2, 64.4, 64.7, 64.8, 65.1, 65.2; 528/480, 528/503; 347/172; 106/31.17, 31.16, 31.27, 106/31.28; 503/201, 200
See application file for complete search history.

(56) References Cited

U.S. PATENT DOCUMENTS

| | | | | |
|---|---|---|---|---|
| 5,166,041 A | * | 11/1992 | Murofushi et al. | .......... 430/339 |
| 5,296,439 A | * | 3/1994 | Maruyama et al. | .......... 503/201 |
| 5,572,311 A | * | 11/1996 | Abe et al. | .................. 399/127 |
| 5,711,809 A | | 1/1998 | Kimura et al. | |
| 5,965,200 A | | 10/1999 | Tateyama et al. | |
| 6,451,494 B1 | * | 9/2002 | Kabai | .................. 430/108.21 |
| 6,503,568 B1 | | 1/2003 | Oota et al. | |
| 2005/0072733 A1 | * | 4/2005 | Consolini et al. | ........... 210/634 |

FOREIGN PATENT DOCUMENTS

| | | |
|---|---|---|
| EP | 0 296 249 A1 | 12/1988 |
| JP | 59-9654 | 1/1984 |
| JP | 05-297627 | 11/1993 |
| JP | 8-7347 | 1/1996 |
| JP | 2001-184732 | 7/2001 |
| JP | 2002-177880 | 6/2002 |
| JP | 2004-247570 | 9/2004 |

OTHER PUBLICATIONS

Ueno, Y. et al "Near-Infrared Raman Spectra of Azo Dye Produced by a Nitrogen-Dioxide-Gas-Selective Coloration in a Porous Glass Chip" Applied Spectroscopy, vol. 55, N. 9, 2001.*

* cited by examiner

*Primary Examiner*—Ling-Siu Choi
*Assistant Examiner*—Frances Tischler
(74) *Attorney, Agent, or Firm*—Wenderoth, Lind & Ponack, L.L.P.

(57) ABSTRACT

If an ultraviolet curing resin is colored by contamination by another substance, there have been issues regarding increased cost and the environmental burden of treating the waste solution due to an inability to recycle the resin as it is. The ultraviolet curing resin that is in a colored, uncured state is decolored in the present invention by irradiation of light having a wavelength in the vicinity of the maximum absorption wavelength of the coloring material, and then recycled. As a result, it is possible to reduce costs and contribute to the protection of the environment.

12 Claims, 1 Drawing Sheet

METHOD AND APPARATUS FOR RECYCLING ULTRAVIOLET CURING RESIN, AND METHOD FOR MANUFACTURING OPTICAL RECORDING MEDIUM USING THAT RECYCLING METHOD

BACKGROUND OF THE INVENTION

1. Field of the Invention

The present invention relates to methods and apparatuses for recycling ultraviolet curing resins that are in a colored, uncured state, and to methods for manufacturing optical recording media using those recycling methods.

2. Background Information

After light curing, ultraviolet curing resins are capable of expressing multiple functionality through the action of photopolymerizable monomers, photopolymerizable oligomers and various additives contained in the resins. Moreover, they are widely used in a variety of applications because of advantages such as low temperature curability and mass producibility.

If the uncured state of an ultraviolet curing resin is a liquid, then as the conventional method for recycling ultraviolet curing resins, it has been standard practice to recover the residual resin from the manufacturing process while it is still in the liquid state, and use it after removing foreign matter by filtering through a filter, for example.

Ultraviolet curing resins are used in optical recording media for substrate adhesion and for protecting the constituent layers and the like. As a method for re-using ultraviolet curing resins in the manufacture of optical recording media, it has been standard practice to remove foreign matter by filtering. (See Japanese Unexamined Patent Publication No. H08-7347A).

Furthermore, write-once optical recording media that use dye components in the recording layer have a structure in which the recording layer is formed on the substrate, and information is recorded by irradiating laser light from the substrate side. The dye component that forms the recording layer absorbs the irradiated laser light and causes a thermal change such as heating, melting, decomposition or vaporization, and as a result, the recording occurs by physical changes such as deformation of the substrate or changes to the dye. Furthermore, the recorded information is reproduced by reading changes in the reflectivity of the parts in which physical changes have occurred and the parts where they have not occurred, due to the laser light.

Dyes such as metal containing azo-based dyes, which are chelated compounds of azo compounds and metals, cyanin-based dyes and phthalocyanin-based dyes are readily available as the dye material used here. Of these, optical recording media that are recorded by absorbing laser light having a wavelength of 630 to 660 nm have undergone particular development and investigation, and are the standard for 1 to 8 speed recording DVD-R media. It is anticipated that DVD-R media will be developed to handle high speed recording in the future, and will undergo rapid commercial expansion in conjunction with recording drives in a similar manner to the development of CD-Rs.

In the manufacture of write-once optical recording medium in which dye components are used, a recording layer made of the dye component is formed on the substrate after which the excess portion of the dye component is removed by a process such as washing. The medium then passes through a process of film formation of a reflective layer, and then an adhesive layer or protective layer is formed using an ultraviolet curing resin. The photopolymerizing monomer or the photopolymerizing oligomer, which is the principal component of the ultraviolet curing resin, contains multiple varieties of functional groups in its molecular structure, and thus it is immediately colored when the ultraviolet curing resin contacts the small amount of dye component residual on the optical recording medium.

In the process of film forming the ultraviolet curing resin, it is necessary to reject excess resin caused by overrun in order to prevent visual flaws such as air bubbles, and to ensure mechanical properties.

As a method for recycling the ultraviolet curing resin, an example is known in which the rejected resin is collected, added to the unused mother liquor, diluted to a level that maintains the characteristics, and then used (see Japanese Unexamined Patent Publication No. 2001-184732A).

However, in JP H08-7347A, with these methods there is no improvement to the color, even if foreign matter such as grit are removed. Furthermore, in No. 2001-184732A, it is necessary to confirm the concentration of the contaminating dye, and thus there is a risk that the process will become too complex and cause a drop in productivity. Furthermore, conventional methods have been insufficient if the colorability of the contaminating dye is high, or due to the solution's shade, the waste solution must be disposed, because the method disclosed in No. 2001-184732A cannot be used because there is a risk of compromising the product quality even due to a minute quantity of dye, thus making the solution unusable.

In view of the above, it will be apparent to those skilled in the art from this disclosure that there exists a need to simplify the recycling of an ultraviolet curing resin that is in an uncured state, and that has been colored by mixing with another substance, particularly an organic compound, so as to reduce costs and to contribute to reducing the burden of waste solution treatment on the environment.

SUMMARY OF THE INVENTION

In order to solve the above-noted conventional issues, the method for recycling an ultraviolet curing resin of the present invention is a method for recycling an ultraviolet curing resin that has been colored by contact or mixing with another substance, and that is decolored in its uncured state. Attention has been drawn to the fact that the ultraviolet curing resin itself is colorless or is a slightly yellow transparent material and that the coloring material has a maximum absorption wavelength that is longer than that of the ultraviolet curing resin, and it has been found that the ultraviolet curing resin may be recycled by decoloring the ultraviolet curing resin by irradiating light having a wavelength in the vicinity of the maximum absorption wavelength of the coloring material.

Furthermore, it is preferable that the ultraviolet curing resin contains photo initiators that are included for the object of accelerating the hardening polymerization reaction of the ultraviolet curing resin, and that the maximum absorption wavelength $\lambda 1$ of the photo initiator, and the maximum absorption wavelength $\lambda 2$ of the colored substance, which is made from an organic compound, satisfies the following expressions:

$\lambda 1 < \lambda 2$, $\lambda 1 \leq 420$ nm.

Furthermore, in the present invention, it is preferable that a wavelength $\lambda 3$ of light for irradiating the colored ultraviolet curing resin is in the vicinity of the maximum absorption wavelength of the colored substance, and it is further preferable that the wavelength λ3 and the maximum absorption wavelength of the coloring material λ2 satisfy the expression:

$$(\lambda 2-40) \text{ nm} \leq \lambda 3 \leq (\lambda 2+80) \text{ nm}.$$

This is in order that, provided that the wavelength is within the bounds of the above-noted expression, absorption of light by the coloring material occurs to a certain degree, and since the refractive index is relatively large it is thus possible to efficiently convert the energy of the light that is irradiated to decolor the coloring material.

The device for recycling the ultraviolet curing resin of the present invention is a device for recycling an ultraviolet curing resin that is in a colored, uncured state, and is provided with a recovery portion for recovering the ultraviolet curing resin, and a light irradiation portion for decoloring by irradiating the ultraviolet curing resin with light of a wavelength in the vicinity of the maximum absorption wavelength of a coloring substance in the ultraviolet curing resin.

Furthermore, the device for recycling the ultraviolet curing resin may also be provided with a cooling function for suppressing thermal generation while irradiating light, a function for filling the vicinity of the irradiation of the light with an inert gas or dry air to suppress the photopolymerization of the ultraviolet curing resin, and a filtering function such as a filter for removing foreign matter after decoloring by the irradiation of light.

Moreover, the method for manufacturing the optical recording medium of the present invention is a method for manufacturing an optical recording medium that has a recording layer, made of a dye composition on a substrate, and for forming an adhesive layer or a protective layer using an ultraviolet curing resin, wherein the manufacturing method uses the method for recycling an ultraviolet curing resin described previously, and forms the adhesive layer or the protective layer using the recycled ultraviolet curing resin.

With the method for recycling, the device for recycling and the method for manufacturing the optical recording medium in which the method for recycling is used according to the present invention, the ultraviolet curing resin of the present invention may be decolored in an uncured state even if colored by another substance, and recycled, and thus it is possible to reduce the burden on the environment caused by treatment of the waste solution, and to reduce the cost.

It should be noted that the method for recycling the ultraviolet curing resin of the present invention is particularly appropriate for a process of manufacturing rewritable optical recording media that use organic dyes, however it may be used in a similar manner in alternative applications provided that the process is one in which the ultraviolet curing resin is colored while in an uncured state.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE INVENTION

The following is a description of an embodiment of the present invention. In the present invention, there is no particular limitation to the ultraviolet curing resin, and photopolymerizing oligomers and photopolymerizing monomers, or photo initiators and various additives may be mixed in. The following are specific examples of such constituent materials, but the materials are not limited to these.

Material such as epoxy acrylate, fluoro epoxy acrylate, urethane acrylate, polyester acrylate, unsaturated polyester, polyether acrylate, vinyl acrylate, polybutadiene acrylate polystyrylethyl methacrylate and heat resistant ultraviolet curing resins are preferable as the photopolymerizing oligomer.

Materials such as fatty series-, alicyclic- and aromatic- acrylates, methacrylate, and pyrolidone-based and vinyl acetate-based vinyl monomers are preferable as the photopolymerizing monomer.

Materials such as acetophenones, benzoin ether, benzyl dimethyleketal, benzophenone, methyl-O-benzoylnenzoate, thioxanthone, α-acyloxime ester, acylphosphone oxide, glyoxyester, 3-ketocoumarin, 2-ethylanthraquinone and camphorquinone are preferred photo initiators.

Additionally, various additives such as dilution agents, photo initiator assistors that are used in conjunction with photo initiators, polymerization inhibitors that impart storage stability, polymerization inhibitors, thixotropic agents, modifiers and leveling agents may be added depending on their purpose. When a maximum absorption wavelength λ1 of photo initiators that are included for the purpose of facilitating the hardening polymerization reaction of the ultraviolet curing resin is 420 nm or less, then the contaminating substance is an organic compound and the relationship with the maximum absorption wavelength λ2 of that compound is expressed in the following Expression 4 and Expression 5:

$$\lambda 1 < \lambda 2 \qquad \text{(Expression 4)}$$

$$\lambda 1 \leq 420 \text{ nm} \qquad \text{(Expression 5)}$$

At this time, it is further preferable that the wavelength λ2 is at least 60 nm longer than the wavelength λ1. Furthermore, if using a plurality of photo initiators, it is possible to the take the largest maximum absorption wavelength or the longest maximum absorption wavelength to be λ1.

Furthermore, in the present invention, a wavelength λ3 of light that irradiates the colored ultraviolet curing resin is preferably in the vicinity of the maximum absorption wavelength of the coloring substance, and it is even more preferable that the relationship of λ3 with the maximum absorption wavelength λ2 of the coloring substance satisfies the following expression (Expression 6):

$$(\lambda 2-40) \text{ nm} \leq \lambda 3 \leq (\lambda 2+80) \text{ nm} \qquad \text{(Expression 6)}$$

This is in order that, provided that the wavelength is within the bounds of Expression 6, absorption of light by the coloring material occurs to a certain degree, and since the refractive index is relatively large, it is thus possible to efficiently convert the energy of the light that is irradiated to decolor the coloring material.

Provided that the light is appropriate, there is no particular limitation to the source of the irradiating light, however a laser that is efficient and capable of output power adjustment is preferred. More specifically, argon ion lasers, HeNe lasers, semiconductor lasers are more preferable. Furthermore, depending on their capabilities the irradiating power of the light of the laser may be altered, or the light may be irradiated discontinuously through the division of time into small discrete segments.

In the present invention, it is preferable that the color of colored substances that are blended into ultraviolet curing resins can be confirmed by the naked eye. When colorability and solubility in ultraviolet curing resins are considered, organic compounds are preferred, and dyed compositions are further preferred.

In the present invention, there is no particular limitation to the dyeed composition, however at least one variety is preferably a cyanin-based dye, or a metal chelate complex of an azo compound.

It is further preferable that the metal chelate complex of the azo compound is a chelate compound of a metal and the compound represented below (Formula 2), for example.

In Formula 2, D is a monocyclic compound or a condensed ring having at least five members and may include at least one selected from a group consisting of oxygen atoms and sulfur atoms, and may further include nitrogen atoms other than shown in the formula; B is a monocyclic compound or a condensed ring and may be configured by carbon atoms and hydrogen atoms, or may be configured by carbon atoms and nitrogen atoms and hydrogen atoms; D and B may also include any substitution group; and Z is an alkyl group of at least one carbon atom, and whose hydrogen atoms may be substituted by at least one fluorine atom.

In Formula 2 noted above, it is even more preferable that D or B has at least one group selected from a group consisting of an alkyl group, an alkoxy group, a cyanoalkoxy group, where hydrocarbons are substituted or partially substituted with fluorine atoms in each of the three groups, a nitro group, a cyano group, a halogen group and a substitution group having a monocyclic compound or a condensed ring that includes at least one of a carbon atom, nitrogen atom, oxygen atom or sulfur atom.

In the above-noted dye composition, considering the absorption wavelength, it is preferable that the metal that forms the chelate complex is at least one selected from a group consisting of Co, Ni, Cu and Zn.

Embodiment 1

Figure 1:
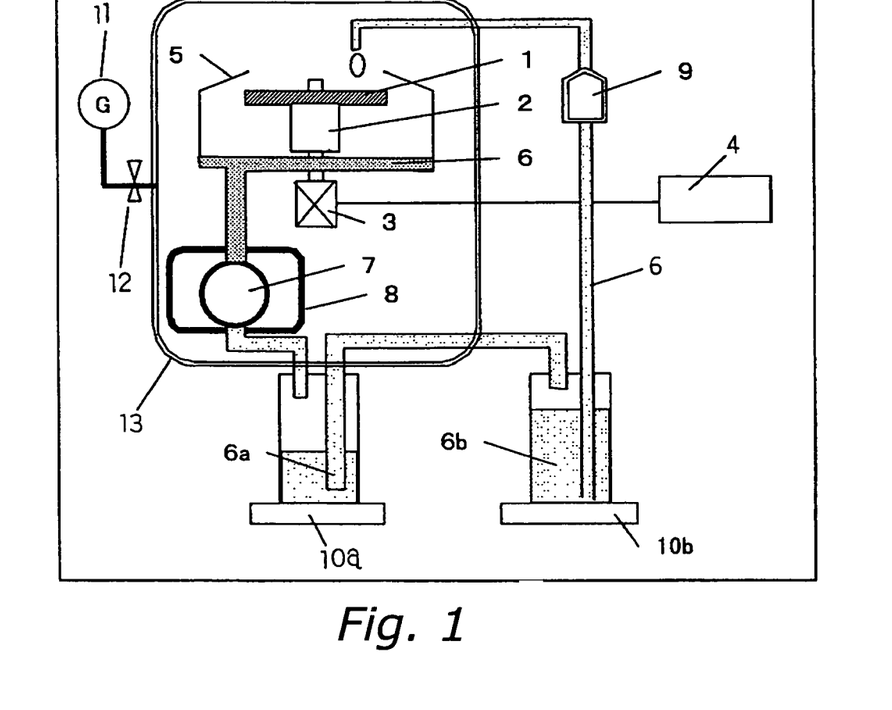
FIG. 1 is a diagram that schematically shows a manufacturing device to illustrate an example of a recycling method of an ultraviolet curing resin of the present invention.

As Embodiment 1 of the present invention, a manufacturing device schematically shown in FIG. 1 is used to explain an example of a recycling method of an ultraviolet curing resin of the present invention.

As shown in the drawing, a manufacturing device that uses the recycling method is made of a base material 1 that is coated with an ultraviolet curing resin, a holding portion 2 onto which the base material 1 is mounted, a movable portion 3 that is capable of moving the holding portion 2 with a control portion 4, a recovery cover 5, a light irradiating portion 7 and a holding tank 10a that holds decolored ultraviolet curing resin 6a. Depending on the amount of colored resin that is discharged, and the decoloring rate at the light irradiating portion 7, for example, it is also possible to keep the colored resin temporarily in a tank, or the like, upstream of the light irradiating portion 7, before passing the colored resin through the light irradiating portion 7.

Furthermore, depending on the irradiation conditions of the decoloring light, a cooling device 8 may be provided in the surroundings of the light irradiating portion 7 for the purpose of suppressing temperature increases when the temperature in the vicinity of the device rises due to thermal generation during irradiation. As a rule, cooling should be to a level in which the light incident face of the irradiating portion does not cloud over due to condensation from excessive cooling. It should be noted that there is no particular problem with thermal generation during light irradiation provided that the temperature of the liquid ultraviolet curing resin is not more than 60° C., but when the viscosity and workability of the ultraviolet curing resin are considered, the temperature is preferably 10 to 40° C.

Also, in order to stabilize the uncured state of the ultraviolet curing resin, inert gas or dry air may be introduced from a gas supply portion 11 via a valve 12 into a gas-filled tank 13. The size of the gas dosing tank 13 is not limited to the size illustrated, and may be set according to its performance.

Furthermore, a holding tank 10b for unused ultraviolet curing resin 6b may be provided depending on the volume of the ultraviolet curing resin, and this may also be used for the recycling resin. Accordingly, it is also possible to install the light irradiation portion 7 and the cooling device 8 after the location at which the recovered colored resin is mixed to the unused ultraviolet curing resin 6b in order to increase the efficiency of the process.

If filtering is necessary to remove foreign matter, then this may be carried out with a filter 9. Installation of the filter is not limited to the location illustrated, but it should be installed in a location to give good efficiency.

The configuration as illustrated is one example of an efficient location, and it goes without saying that devices such as for controlling the amount of ultraviolet curing resin that is droppered, dosing pumps for accurately pumping the resin, pressure gauges, back pressure gauges and solenoid valves may be installed depending on the application.

It should be noted that in the device for manufacturing the optical recording medium, the recovery cover 5 and the light irradiation portion 7 constitute the device for recycling the ultraviolet curing resin. As another embodiment, the light irradiation portion of the recycling device may be provided separately to the manufacturing device, and in that case the ultraviolet curing resin collected by the recovery cover 5 is transported by transportation means to the light irradiation portion. Furthermore, in the manufacturing device noted above, the ultraviolet curing resin recycled at the light irradiation portion 7 may be used in a device for manufacturing optical recording media other than the manufacturing device that is illustrated.

Embodiment 2

A method for manufacturing an optical recording medium in which the above noted recycling method is used is described as Embodiment 2 of the present invention.

Figure 2:
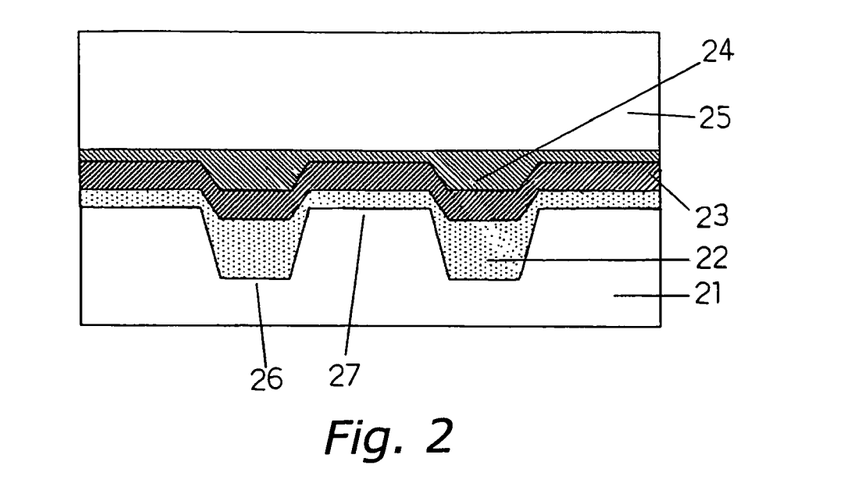
FIG. 2 is a structural cross-section view showing an example of an optical recording medium of the present invention.

FIG. 2 shows a structural cross-section of an example of the optical recording medium of the present invention. As illustrated, a substrate 21, a recording layer 22, a reflective layer 23, an adhesion layer 24 and an adhesion substrate 25 are sequentially stacked to form the optical recording medium. The substrate 21 is provided with a groove portion 26 (a continuous spiral indentation) and a land portion 27 in appropriate locations on a face opposite the face on which the laser light is incident.

There is no particular limitation to the substrate 21 provided that it is made of a material that is transparent to the laser light used for recording, however, for example, glass, and plastics such as polycarbonate resin, methacryl resin, polyolefin resin and acrylic resin are preferable. Of these, polycarbonate resin is particularly preferable because of its excellent injection moldability and transcriptability.

The recording layer 22 is made of a dye compound, for example, phthalocyanin-, polymethin-, styryl-, porphin-, anthraquinone-, azo-, cyanin- and squarylium-based compounds. Particularly, it is preferable to choose from complexes of metal chelates of azo compounds and cyanin-based dyes, and may be a mixture of a plurality of types having the same base dye. The film thickness of the recording layer 22 in the groove 26 is preferably 20 to 150 nm, and 30 to 100 nm is particularly preferable.

There is no particular limitation to the reflecting layer 23 provided that it is made of a material that effectively reflects light that passes through the recording layer, however, for example, it is possible to use highly reflective metals such as Au, Ag, Cu and Al, or alloys including those metals. In order to obtain effective light reflection, the film thickness is preferably at least 50 nm, and 100 to 200 nm is particularly preferable because conduction, and shielding of heat during recording is effective. The reflective layer 23 may also be a plurality of layers where necessary. Furthermore, the recording layer 23 may be formed from material in which the distribution of metallic elements differs, and such material may also be stacked.

There is no particular limitation to the adhesive layer 24 provided that it is made of a material that can stick the reflective layer 23 and the adhesive substrate 23 together, however, for example, resins such as ultraviolet curing resins and curable resins are preferable because of their excellent mass producibility. The adhesive layer 24 may also be in stacked form where necessary.

The adhesive substrate 25 may be a substrate on which a signal is recorded in advance, or a substrate on which a layer that is capable of recording signals is formed.

The optical recording medium may be manufactured as follows, for example: First, the substrate 21 is prepared, and then the recording layer 22 is formed thereon. Where necessary, layers such as an under layer may be provided between the substrate 21 and the recording layer 22. There is no particular limitation to the method for forming the recording layer 22, but, for example, spin coating, dipping, vacuum vapor deposition and sputtering may be applied. Of these, spin coating is preferable because it can easily create a mixture having a uniform state. Binders such as polyvinyl alcohol, cellulose and polyvinyl butyral may be blended at this time where necessary. Furthermore, in order to ensure the stability of the desired recording layer, additives such as dispersion agents, other varieties of dye and metal chelate compounds as single oxygen quenchers may be included where appropriate. There is no particular limitation to the solvent when forming the recording layer by spin coating or dipping, however solvents such as ethylcellosolve, diacetone alcohol, cyclohexane, tetrafluoropropanol and octofluoropropanol are suitable as they are relatively inexpensive.

Next, the reflective layer 23 is formed on the recording layer 22. There is no particular limitation to the method, however, for example, methods such as vacuum vapor deposition and sputtering may be used. Then, the optical recording medium may be formed by forming the adhesive layer 24 on the reflective layer 23 and then sticking the adhesive substrate 25 onto that.

The optical recording medium used in the present invention can be manufactured as described above, but the method for manufacturing the optical recording medium of the present invention is a method for recycling the uncured ultraviolet curing resin, which is colored by the dye compound through contact with a part of the recording layer 22 when forming an ultraviolet curing resin as the adhesive layer 24. The manufacturing method for processes other than forming the ultraviolet curing resin layer is not limited to this, and the optical recording medium may be manufactured by alternative methods. Furthermore, the structure of the optical recording medium of the present invention is not limited to the structure noted above, and it may have alternative structures.

EXAMPLES

More specific embodiments of the present invention are hereafter described in further detail. Here, the ultraviolet curing resin produced during the fabrication of the optical recording medium is used as the colored ultraviolet curing resin. The examples illustrate a method for decoloring and recycling the resin and a device using this method.

Example 1

1-1. Fabricating the Colored Ultraviolet Curing Resin

A cyanin-based dye (catalog name: ST1269 manufactured by Nihon Siber Hegner KK) was added to tetrafluoropropanol to give a 1 wt % solution, this was dispersed by ultrasound for 30 minutes at 50° C., after which it was pressure filtered to give a dye solution. This solution was coated by spin coating onto a polycarbonate resin substrate (having a substrate thickness of 0.6 mm, a track pitch of 740 nm, a groove width at half height of 300 nm and a groove depth of 170 nm) to form a recording layer. An Ag film having a film thickness of 15 nm was formed on the recording layer by sputtering to give a reflective layer. Still further, an ultraviolet curing resin containing a photo initiator whose maximum absorption wavelength is 420 nm or less (trade name: XNR-5526AP, manufactured by Nagase ChemTex Corporation) was spin coated onto the reflective layer, and an adhesive substrate having a substrate thickness of 0.6 mm was placed on it, resulting in the pre-cured state.

At this time, the excess ultraviolet curing resin was recovered inside the recovery cover of the spin coater, and the above-noted process repeated to fabricate the colored ultraviolet curing resin until the amount necessary for recycling was recovered. The ultraviolet curing resin was colored purple at this time. Furthermore, when the optical spectrum of the colored resin solution was measured with a spectrophotometer (UV-3100, manufactured by Shimadzu Corporation), the maximum absorption wavelength of the colored portion was 590 nm.

1-2. Fabricating the Resin for Re-Use

The ultraviolet curing resin that was recovered as noted above was irradiated in the light irradiation portion provided with a HeNe laser having a wavelength of 633 nm as the light source.

1-3. Fabricating the Optical Recording Medium

The substrate on which the reflective layer was formed, described in 1-1, was stuck to the adhesive substrate 25 using the resin fabricated in 1-2, and photocured with a high pressure mercury lamp (optical intensity: 500 mJ/cm$^2$) to fabricate the optical recording medium.

Example 2

Apart from using a semiconductor laser having a wavelength of 657 nm as the light source of the light irradiation portion, Example 2 was fabricated in a similar manner to Example 1.

Example 3

As the dye compound for coloring the resin, a nickel chelate complex was synthesized in a manner described below using the azo compound expressed in Formula 3, and apart from the use of the compound, Example 3 was fabricated in a similar manner to Example 1. It should be noted that the maximum absorption wavelength of the colored ultraviolet curing resin was 588 nm.

Formula 3

3-1 Synthesis of the Nickel Chelate Complex (Formula 3)

(1) [Synthesis of 6-(5-trifluoromethyl-1,3,4-thiadiazolyl-2-azo)-1-methyl-7-(trifluoromethanesulfonylamino)-1,2,3,4-tetrahydroquinoline (Formula 3)]

First, 3.6 g of 44% nitrosylsulfuric acid was cooled to 5° C., into which 4.7 mL of acetic acid, 8.7 mL of 62% sulfuric acid and 0.4 ml of 60% nitric acid was added, and into which 2 g of 5-trifluoromethyl-1,3,4-thiadiazol was dropped over 10 minutes and stirred (this was taken to be solution A).

On the other hand, 35 mL of methanol, 0.24 g of urea and 3.5 g of 1-methyl-7-(trifluoromethanesulfonyl)amino-1,2,3,4-tetrahydroquinoline were added in a separate container, dissolved and cooled. Into this, solution A was dropped in over 12 minutes and agitated for 40 minutes, after which 10 mL of sodium bicarbonate water and 10 mL of water were added, the solution crystallized, filtered and refined to obtain the desired material (0.3 g obtained).

(2) [Complexing]

0.3 g of the ligand obtained in (1) was suspended in 6 mL of methanol, heated and agitated, and 0.1 g of nickel acetate tetrahydrate added at 50° C. After heating and agitating for two hours, it was allowed to cool, the crystals were filtered, and washed with hot water and methanol to obtain the target material (0.27 g obtained).

Example 4

As the dye compound for coloring the resin, a nickel chelate complex was synthesized in the manner described below using the azo compound expressed in the following Formula 4. Apart from the use of this compound, Example 4 was fabricated in a similar manner to Example 1. It should be noted that the maximum absorption wavelength of the colored ultraviolet curing resin was 586 mm.

Formula 4

4-1. Synthesis of the Nickel Chelate Complex (Formula 4)

(1) [Synthesis of 6-[6-methyl-2-(2-pyridyl)-4-pyrimidinylazo]-1-methyl-N-(trifluoromethanesulfonyl)-aniline (Formula 4)]

First, 1.0 g of 1-methyl-7-(trifluoromethanesulfonylamino)-1,2,3,4-tetrahydroquinoline, 5 mL of methanol, 2.5 mL of acetic acid, 2.5 mL of pyridine, 0.013 g of iodine, and 1 g of 2-hydrazino-5-trifluoropiridine were combined, and 1.2 g of 30% hydrogen peroxide droppered into this over 1.5 hours. After agitating this for 16 hours, the crystals obtained by filtering were washed with hot methanol to obtain the target material (0.41 g obtained).

(2) [Complexing]

0.41 g of the ligand obtained in (1) was suspended in 6 mL of methanol, heated and agitated, to which 0.1 g of nickel acetate tetrahydrate added at 50° C. After refluxing for a further two hours, it was allowed to cool, the crystals were filtered and washed with hot water and hot methanol to obtain the target material (0.32 g obtained).

Example 5

As the dye compound for coloring the resin, a nickel chelate complex is synthesized in a manner described below using the azo compound expressed in the following Formula 5. Apart from the use of this compound, Example 5 was fabricated in a similar manner to Example 2. It should be noted that the maximum absorption wavelength of the colored ultraviolet curing resin was 590 nm.

Formula 5

5-1. Synthesis of the Nickel Chelate Complex (Formula 5)

(1) [Synthesis of 6-(5-trifluoromethyl-2-pyrimidylazo)-1-methyl-N-(trifluoromethanesulfonyl)-aniline (Formula 5)]

1.3 g of 1-methyl-7-(trifluoromethanesulfonylamino)-1,2,3,4-tetrahydroquinoline, 17 mL of methanol, 5 mL of acetic acid, 0.06 g of iodine and 2.2 g of 2-hydrazino-5-trifluoropiridine were added, and 2.7 g of 30% hydrogen peroxide droppered into this over one hour. After agitating this for two hours, the crystals obtained by filtering were washed with hot methanol to obtain the target material (0.62 g obtained).

(2) [Complexing]

0.60 g of the ligand obtained in (1) was mixed with 0.17 g of nickel acetate tetrahydrate in 5 mL of methanol, and allowed to cool after refluxing for two hours. The crystals were filtered and washed with hot water to obtain the target material (0.57 g obtained)

Example 6

As the dye compound for coloring the resin, a nickel chelate complex was synthesized in a manner described below using the azo compound expressed in the following Formula 6. Apart from the use of this compound, Example 6 was fabricated in a similar manner to Example 1. It should be noted that the maximum absorption wavelength of the colored ultraviolet curing resin was 586 nm.

Formula 6

6-1. Synthesis of the Nickel Chelate Complex (Formula 6)

(1) [Synthesis of 2-(6-cyano-3-benzoisoxazolylazo)-5-(diethylamino)-N-trifluoromethanesulfonylaniline (Formula 6)]

First, 0.49 g of 3-amino-6-cyanobenzoisoxazole, 3 mL of acetic acid, and 1.5 mL of propionic acid were added together and cooled to 0° C., into which 0.31 mL of 62% sulfuric acid was droppered in 5 minutes (this was taken to be solution A). On the other hand, 1.23 g of a trifluoromethanesulfone acid salt of 3-(diethylamino)-N-trifluoromethane sulfonylaniline, 0.75 g of sodium acetate, 0.075 g of urea, and 9 mL of methanol were added together in a separate container and cooled to 0° C. (this was taken to be solution B).

Next, 1.1 g of 44% nitrosylsulfuric acid was droppered into solution A over 30 minutes at −5° C. or less, and after agitating this solution for two hours, it was droppered into solution B over 1.5 hours at −5° C. or less. Further still, after agitating for 1.5 hours, the crystals were filtered and refined to obtain the target material (0.21 g obtained).

(2) [Complexing]

0.21 g of the ligand obtained in (1) was suspended in 3 mL of methanol, heated and agitated, and 0.06 g of nickel acetate tetrahydrate was added at a solution temperature of 55° C. After heating and agitating for two hours, the crystals were hot filtered, washed with hot water, further washed with acetone and methanol and filtered, and dried to obtain the target material (0.19 g obtained).

Example 7

As the dye compound for coloring the resin, a nickel chelate complex was synthesized in a manner described below using the azo compound expressed in the following Formula 7. Apart from the use of this compound, Example 7 was fabricated in a similar manner to Example 1. It should be noted that the maximum absorption wavelength of the colored ultraviolet curing resin was 580 nm.

Formula 7

7-1. Synthesizing the Nickel Chelate Complex (Formula 7)

(1) [Synthesis of 2-(4,5-dicyano-3-ethyl-2-imidazolylazo)-5-(diethyl amino)-N-(trifluoromethanesulfonyl)aniline (Formula 7)]

18 mL of water and 4 mL of 35% hydrochloric acid were mixed, and 0.6 g of 2-amino-4,5-dicyanoimidazol was added to this and cooled to not more than 5° C. A solution of 0.34 g of sodium nitrite dissolved in 2 mL of water was droppered into this over 15 minutes and agitated at no more than 5° C. to obtain a reacted solution that includes a diazonium salt (this was taken to be solution A). On the other hand, 1.3 g of 3-(diethylamino)-N-(trifluoromethanesulfonyl) aniline was dissolved in 15 mL of methanol in a separate container, and cooled to not more than 5° C.

Solution A was droppered into this solution over 30 minutes at less than 5° C., and after agitating for one hour, the reacted solution was filtered and dried to obtain a precursor. 1.7 g of the precursor was mixed with 40 mL of methanol and 0.6 g of potassium carbonate, and was agitated for 3 hours after droppering in 0.45 mL of diethyl sulfate over one hour. The crystals obtained by filtering the reacted solution were rinsed with hot water and hot methanol to obtain the target material (1.7 g obtained)

(2) [Complexing]

1.5 g of the ligand obtained in (1) was mixed with 30 mL of methanol, and 0.45 g of nickel acetate tetrahydrate was added at 45° C. and refluxed for 3 hours. The crystals obtained by hot filtering were rinsed with hot water and acetonitrile to obtain the target material (1.2 g obtained).

Example 8

Apart from providing a cooling device to cool the temperature of the resin to 110° C. when decoloring the ultraviolet curing resin, Example 8 was fabricated in the same manner as Example 4.

Example 9

Apart from introducing gas such that the sequence of operations occurs in a nitrogen atmosphere, Example 9 was fabricated in the same manner as Example 4.

Example 10

Apart from filtering the ultraviolet curing resin fabricated in 1-2 through a filter having a 0.2 μm mesh, whose material was formed from polytetrafluoroethylene (PTFE), Example 10 was formed in the same manner as Example 1.

Comparative Example 1

Apart from using an argon ion laser having a wavelength of 515 nm as the light source of the light irradiation portion, Comparative Example 1 was fabricated in the same manner as Example 1.

Comparative Example 2

Apart from using a semiconductor laser having a wavelength of 680 nm as the light source of the light irradiation portion, Comparative Example 2 was fabricated in the same manner as Example 1.

Comparative Example 3

Apart from increasing the temperature of the resin to 80° C. when decoloring the ultraviolet curing resin, Comparative Example 3 was manufactured in the same manner as Example 4.

Comparative Example 4

An optical recording medium whose substrate was formed up to the reflective layer given in 1-1 of Example 1 was fabricated using an ultraviolet curing resin that had a color as recovered.

Comparative Example 5

Apart from filtering the colored ultraviolet curing resin through a filter having a 0.2 μm mesh, whose material is formed from polytetrafluoroethylene (PTFE), Comparative Example 5 was formed in the same manner as Comparative Example 4.

The initial external appearance of the adhesive substrate of Examples 1 to 10 and Comparative Example 1 to 5, fabricated as described above, was judged as by visual inspection. Adhesive strength and storability were also evaluated.

In judging the initial state by visual inspection, a state that was evaluated to be capable of actual use was given an A, one in which the color was slightly removed was given a C, and one in which substantially no change was seen, and which was unusable was given an F.

Adhesive strength was tested by dropping the optical recording medium perpendicularly from a height of 1.2 m to confirm film delamination. The standard for judgment was expressed by A if none of the ten test pieces delaminated, by C if 1 to 3 of the pieces delaminated, and by F if 4 or more pieces delaminated.

For testing storability, the samples were left in an 80° C., 80% RH environment for 200 hours. The adhesive layer was then observed for changes in its external appearance. The result of the evaluation of these items is shown in Table 1.

TABLE 1

|  |  | Maximum absorption wavelength of the colored resin [nm] | Wavelength of the light source of the light irradiation portion [nm] | External appearance of the resin layer | Adhesive strength | Storability |
|---|---|---|---|---|---|---|
| Example | 1 | 590 | 633 | A | A | A |
|  | 2 | 590 | 657 | A | A | A |
|  | 3 | 588 | 633 | A | A | A |
|  | 4 | 586 | 633 | A | A | A |
|  | 5 | 590 | 657 | A | A | A |
|  | 6 | 586 | 633 | A | A | A |
|  | 7 | 580 | 633 | A | A | A |
|  | 8 | 586 | 633 | A | A | A |
|  | 9 | 586 | 633 | A | A | A |
|  | 10 | 586 | 633 | A | A | A |
| Comparative Example | 1 | 590 | 515 | C | C | F |
|  | 2 | 590 | 680 | F | F | F |
|  | 3 | 586 | 633 | A | C | F |
|  | 4 | 590 | none | F | F | F |
|  | 5 | 590 | none | F | F | F |

As is made clear in Table 1, it is possible to decolor a colored ultraviolet curing resin and recycle it through the recycle method of the working examples. Furthermore, there is no loss of adhesive strength of the adhesive layer or loss of storability of an optical recording medium in which this method is used, and the functionality of the ultraviolet curing resin can be demonstrated.

On the other hand, in Comparative Example 1 and Comparative Example 2, the degree of decoloring is insufficient depending on the choice of light source, and thus the adhesive strength and storability is reduced. Furthermore, in Comparative Example 3, there is no problem with decoloring, but the reactivity of the ultraviolet curing resin and the additives is partly lost due to elevated temperatures, and adhesive strength and storability is lowered. On the other hand, there was no effect seen by using material in which the recycling method of the present invention was not performed, or in which the material was only filtered, as in Comparative Example 4 and Comparative Example 5, and these were not suitable for recycling.

The recycling device and method for recycling ultraviolet curing resins of the present invention are applicable as a method and recycling device, for recycling colored ultraviolet curing resins in an uncured state for example. Furthermore, optical recording media that use the recycled resins thereof as high density optical recording media, for example, rewritable optical recording media that use organic dyes as the recording layer, such as CD-R, DVD+/−R, BD-R, or recording media such as CD-ROM, CD-RW, DVD-ROM, DVD+/−RW, DVD-RAM and BD, have an ultraviolet curing resin layer, the ultraviolet curing resin may be colored, and the present invention may be applied to the recycle of such ultraviolet curing resin.

This application claims priority to Japanese Patent Application No. 2004-129280. The entire disclosure of Japanese Patent Application No. 2004-129280 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A method for recycling an ultraviolet curing resin that is in a colored, uncured state, the method comprising:
   collecting a mixture of uncured ultraviolet curing resin comprising at least one photo initiator and an organic composition comprising a coloring substance; than that of the ultraviolet
   decoloring the collected mixture by irradiating the mixture with light of a wavelength in the vicinity of the maximum absorption wavelength of the coloring substance; and
   collecting an ultraviolet curing resin that is in a decolored, uncured state;
   wherein the maximum absorption wavelength of the photo initiator ($\lambda 1$) and the maximum absorption wavelength of the coloring substance ($\lambda 2$) satisfy the following expressions:

$$\lambda 1 < \lambda 2$$

$$\lambda 1 > 420 \text{ nm; and}$$

wherein a wavelength of light that is irradiated for decoloring ($\lambda 3$) and the wavelength $\lambda 2$ satisfy the following expression:

$$(\lambda 2 - 40) \text{ nm} \leq \lambda 3 \leq (\lambda 2 + 80) \text{ nm}.$$

2. The method for recycling an ultraviolet curing resin according to claim 1,
   wherein the organic composition includes at least one dye component made from a cyanin-based dye.

3. The method for recycling an ultraviolet curing resin according to claim 1,
   wherein the organic composition includes at least one dye component made from a metal chelate complex of an azo compound.

4. The method for recycling an ultraviolet curing resin according to claim 3,
   wherein the dye component comprises a chelate complex of an azo compound and a metal, represented by:

where D is a monocyclic compound or a condensed ring having at least five members and optionally includes oxygen atoms or sulfur atoms, and further optionally includes nitrogen atoms other than those shown in the formula; where B is a monocyclic compound or a condensed ring and may be configured by carbon atoms and hydrogen atoms, or may be configured by carbon atoms, nitrogen atoms and hydrogen atoms; where D and B may have any desired substituent groups; and where Z is an alkyl group of at least one carbon atom, and whose hydrogen atoms may be substituted by at least one fluorine atom.

5. The method for recycling an ultraviolet curing resin according to claim 4,
   wherein D or B has at least one group selected from a group consisting of an alkyl group, an alkoxy group, a cyanoalkoxy group, where hydrocarbons are substituted or partially substituted with fluorine atoms in each of the three groups, a nitro group, a cyano group, a halogen group and a substitution group having monocyclic compound or a condensed ring that includes at least one of a carbon atom, nitrogen atom, oxygen atom or sulfur atom.

6. The method for recycling an ultraviolet curing resin according to claim 3, wherein the metal that forms the chelate complex is at least one selected from a group consisting of Co, Ni, Cu and Zn.

7. The method for recycling an ultraviolet curing resin according to claim 1, further comprising:

cooling a light irradiation portion when irradiating light.

8. The method for recycling an ultraviolet curing resin according to claim 1, further comprising:

filling a portion in the vicinity of the irradiation with an inert gas or dry air when irradiating light.

9. The method for recycling an ultraviolet curing resin according to claim 1, further comprising:

removing foreign matter after the decoloring.

10. The method for recycling an ultraviolet curing resin according to claim 9, further comprising:

removing the foreign matter by filtering.

11. A method for manufacturing an optical recording medium comprising a recording layer made of a dye composition on a substrate, the method comprising: forming an adhesive layer or a protective layer on the substrate by using the recycled ultraviolet curing resin obtained by the method according to claim 1.

12. The method for manufacturing an optical recording medium according to claim 11, further comprising:

recovering the ultraviolet curing resin that is in an uncured state and that is colored by contact or contamination with another substance when forming the layers.

* * * * *

UNITED STATES PATENT AND TRADEMARK OFFICE
CERTIFICATE OF CORRECTION

| | |
|---|---|
| PATENT NO. | : 7,846,984 B2 |
| APPLICATION NO. | : 11/102687 |
| DATED | : December 7, 2010 |
| INVENTOR(S) | : Yukako Doi et al. |

It is certified that error appears in the above-identified patent and that said Letters Patent is hereby corrected as shown below:

In column 15, claim 1, line 59, "substance; than that of the ultraviolet" should read --substance;--.

In column 16, claim 1, line 8, "$\lambda 1 > 420$ nm; and" should read --$\lambda 1 \leq 420$ nm; and--.

Signed and Sealed this
Fifth Day of April, 2011

David J. Kappos
*Director of the United States Patent and Trademark Office*